INVENTORS
Harold A. Steinbruegge
and John F. Reuther
BY
F. E. Browder
ATTORNEY

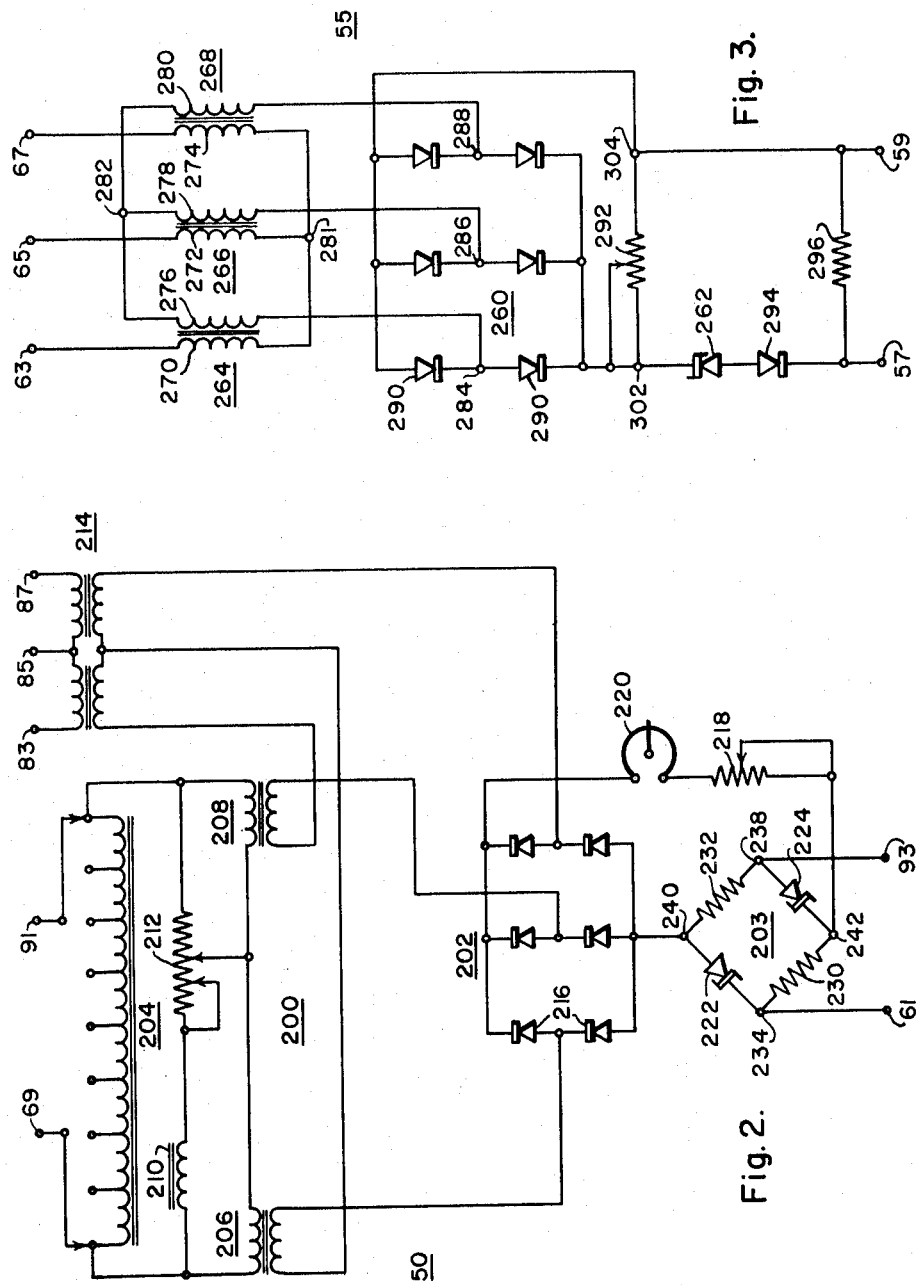

excitation current than required to maintain the desired voltage level of the dynamoelectric machine being controlled, and controlled rectifiers are used to shunt the excess current away from the field winding. The purpose of the firing circuits is to supply to the gate or control electrodes a signal in response to the deviation of the output voltage of the dynamoelectric machine from a reference voltage.

In the highly inductive excitation circuits, a spike voltage for controlling the firing of the controlled rectifiers may lead to instabilities because the voltage spikes may occur while the inductance is discharging and the controlled rectifier may fail to breakdown and conduct. Therefore, to insure firing, the firing pulse should be more than a mere voltage spike. Further requirements of the firing system are that it produce pulses having the required delay angle and pulses that are properly synchronized with the voltage being applied to the field rectifier system.

It is, therefore, desirable that a static firing control system be provided for controlling, with a square wave pulse, the firing or conduction of transistors or controlled rectifiers.

It is also desirable that the width of the square wave firing pulse be proportional to an error signal and the pulse should be synchronized with the supply voltage applied to the rectifiers supplying the field winding of a dynamoelectric machine.

Accordingly, it is a general object of this invention to provide a new and improved static control circuit for excitation systems.

Another object of this invention is to provide a new and improved static firing control system for static switching devices used in excitation systems for dynamoelectric machines.

It is a more particular object of this invention to provide a new and improved firing control system that will provide square wave firing pulses in synchronism with the current applied to the field winding of a dynamoelectric machine, and having a pulse width proportional to the deviation of the output voltage of the dynamoelectric machine from a reference voltage.

Briefly, the present invention accomplishes the above cited objects by obtaining signal pulses from the current supply to the field circuit of the dynamoelectric machine and using these pulses to initiate a succession of signals starting at zero and having a linear slope or ramp. These ramp voltages are compared with an error signal proportional to the deviation of the output voltage of the dynamoelectric machine from a reference voltage, and when the ramp voltage exceeds the error voltage a square wave is generated whose width is therefore proportional to the error voltage. The square wave is terminated by the signal pulses referenced from the current supply to the field circuit of the dynamoelectric machine. The essential synchronism of the firing pulses with the supply current to the field rectifiers, is therefore, obtained because the signal pulses that control the ramp voltage and termination of the firing pulses are obtained from the field rectifier current supply.

Further objects and advantages of the invention will become apparent as the following description proceeds and features of novelty which characterize the invention will be pointed out in particularity in the claims annexed to and forming a part of this specification.

For a better understanding of the invention, reference may be had to the accompanying drawings in which:

FIG. 2 is a schematic diagram of a voltage regulator that may be used with the circuit shown in FIG. 1;

FIG. 3 is a schematic diagram of a current limiting circuit that may be used with the basic circuit shown in FIG. 1;

In order to properly describe the operation of the invention, the static excitation system will be discussed as a whole, with the firing system being described at the proper time, as one of the component parts of the overall system.

Figure 1:
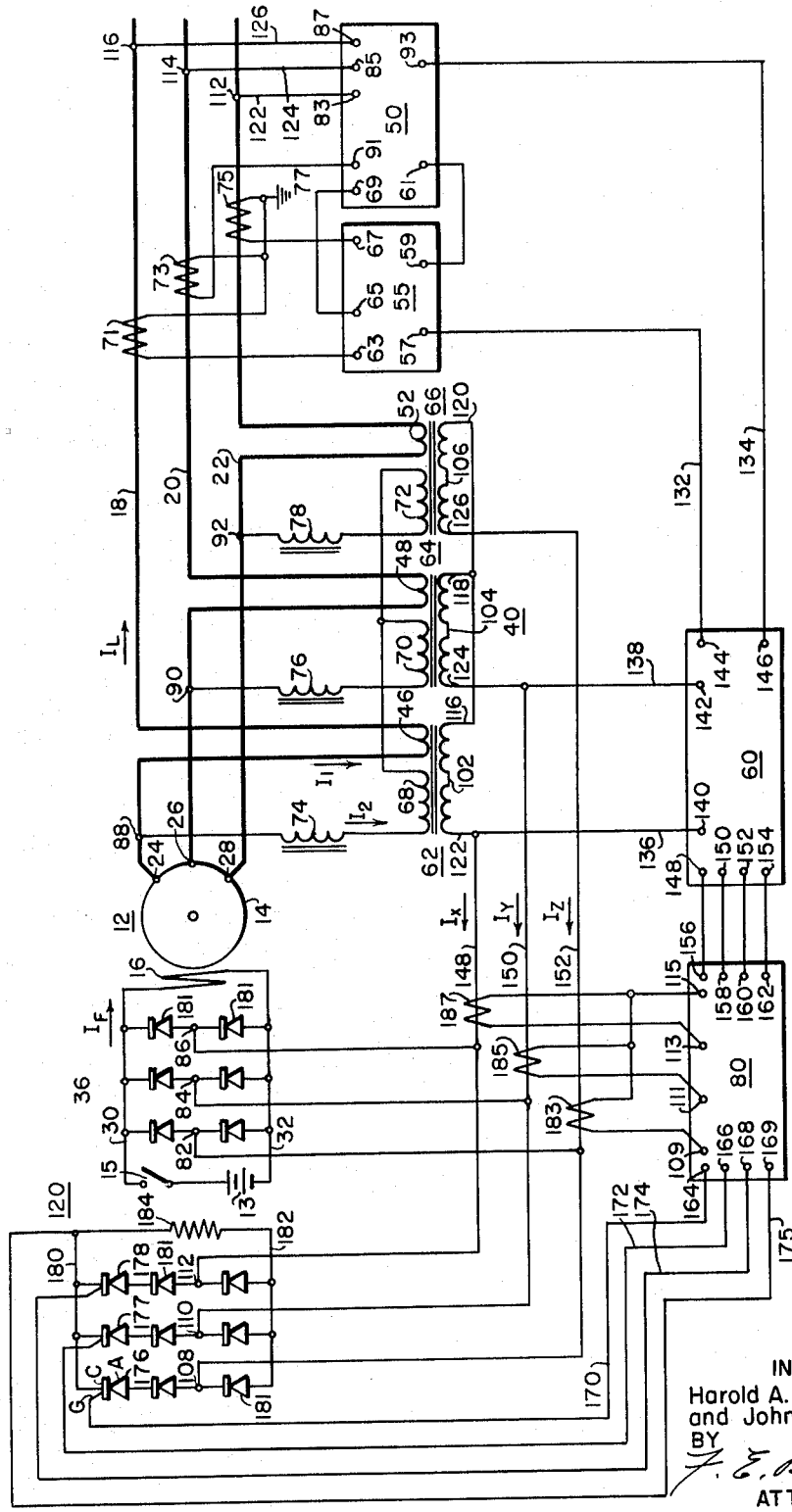
FIGURE 1 shows a basic excitation system in which the invention may be used.

FIG. 1 shows a circuit diagram of a basic excitation system with which the invention may be used. It is a completely self-excited system, with the total excitation current being derived from the output voltage of the dynamoelectric machine, specifically a three phase alternating current generator 12. In the embodiment shown in FIG. 1, the generator 12 comprises an armature 14 and an excitation field winding 16. The generator 12 is disposed to supply alternating current energy to line conductors 18, 20 and 22 through the output terminals 24, 26 and 28, respectively, of the armature 14. In general, current greater than the excitation requirements of the alternating current generator is produced by vector summing circuit 40 and applied to the field rectifier circuit 36. The current produced by vector summing circuit 40 could be arranged to provide close to the proper excitation that the generator 12 requires. However, to compensate for voltage output changes, the vector summing circuit 40 is arranged to provide slightly more current than the value of excitation current required by the generator 12 at any given load and power factor over the operating range. The excess excitation current is shunted away from the field 16 in response to a signal from the voltage regulator 50 as amplified by preamplifier 60. The shunting of a certain portion of current produced by vector summing circuit 40 accomplishes the required voltage regulation because the amount of current shunted is proportional to an error signal or signal proportional to the deviation of the generator output voltage from a predetermined value. It will be noted that the field excitation current, $I_f$, is impressed directly upon the generator field 16 by virtue of rectifier 36, without going through any control device. Therefore, the current from vector summing circuit 40 is not delayed from reaching the generator field 16 and any change in said vector summing current is immediately reflected in the field circuit current $I_f$.

Current $I_f$ is proportional to the vector sum of two currents produced in each phase of vector summing transformer circuit 40. One of these currents, $I_1$, is proportional to the generator line current $I_L$ and is produced by series connected primary windings 46, 48 and 52 of vector summing transformers 62, 64 and 66. The other current $I_2$ is produced by the shunt connected windings 68, 70 and 72 of vector summing transformers 62, 64 and 66 and is responsive to the generator line-to-neutral voltage, but lagging it by substantially 90° by action of the reactors 74, 76 and 78. The reactance of reactors 74, 76 and 78 is large compared with the circuit resistance. Thus, the current $I_2$ is proportional to the generator output voltage but substantially 90° out of phase in the lagging direction with it. As hereinbefore stated, currents $I_1$ and $I_2$ combine vectorially in each phase to form currents $I_X$, $I_Y$ and $I_Z$ which are applied to rectifier 36 at terminals 82, 84 and 86.

More specifically, one side of inductive reactor 74 is connected to line conductor 18 at terminal 88. The other side of inductive reactor 72 is connected to one side of the primary winding 68 of vector summing transformer 62. Similarly, reactor 76 has one side connected to line conductor 20 at terminal 90 and the remaining side of reactor 76 is connected to one side of primary winding 70 of vector summing transformer 64. Reactor 78 has one side connected to line 22 at terminal 92 and its remaining side is connected to one side of primary winding 72 of vector summing transformer 66. The remaining sides of primary windings 68, 70 and 72 of vector summing transformers 62, 64 and 66 each have one side connected together at a common point 101. The primary winding 46 of current transformer 62 is connected in series with main conductor 18; the primary winding 48 of vector summing transformer 64 is connected in series with main conductor 20; and the primary winding 52 of vector summing transformer 66 is connected in series with main conductor 22. The secondary windings 102, 104 and 106 of vector summing transformers 62, 64 and 66 have sides 116, 118 and 120 connected together. Side 122 of secondary winding 102 of vector summing transformer 62 is connected to rectifier 36 at terminal 82 and rectifier 120 at terminal 112. Similarly, side 124 of secondary winding 104 of vector summing transformer 64 is connected to rectifier 36 at terminal 84 and rectifier 120 at terminal 110. The remaining vector summing transformer 66 has side 126 of secondary winding 106 connected to terminal 82 of rectifier 36 and terminal 108 of rectifier 120.

The vector summing transformers 62, 64 and 66 and reactors 74, 76 and 78 are selected so that the combination of series and shunt derived components of excitation current provides slightly more current than the value of excitation current $I_f$ required by the generator 12 at any given load and power factor. Also, as hereinbefore stated, the currents $I_X$, $I_Y$ and $I_Z$ are applied directly to the field winding 16 through rectifier 36. Current $I_f$ does not go through any control devices which tend to give poor transient response.

As previously described, the components of the vector summing circuit 40 are chosen so that they supply a greater current than the current $I_f$ required by the generator 12 at any given load and power factor. The portion of the current to be shunted away from the field winding 16 and, therefore, produce the proper field excitation current $I_f$ is determined by the regulator 50 in combination with current limiting circuit 55. The regulator 50 senses any deviation of the output voltage from the generator 12 from a preset value. This is accomplished by lines 122, 124 and 126 from the regulator 50 to terminals 112, 114 and 116 on line conductors 22, 20 and 18, respectively.

If desired, a current limiting circuit 55 may be provided which senses the generator line current $I_L$ through current transformers 71, 73 and 75. Current limiting circuit 55 operates in conjunction with voltage regulator 50 to supply a signal to the preamplifier and bias circuit 60 when the output of generator 12 is shorted. Terminal 63 of current limiting circuit 55 is connected to one side of current transformer 71. Terminal 65 of current limiting circuit 55 is connected to terminal 69 of voltage regulating circuit 50. Terminal 67 of current limiting circuit 55 is connected to one side of current transformer 75. One side of current transformer 73 is connected to voltage regulating circuit 50 at terminal 91. The remaining sides of current transformer 71, 73 and 75 are connected together and grounded at point 77. One side of the voltage regulator output goes through the current limiting circuit, with terminal 61 of voltage regulating circuit 50 connected to terminal 59 of current limiting circuit 55. Terminal 57 of current limiting circuit 55 is connected through line 132 to preamplifier and bias circuit 60.

Any deviation of the output voltage on the conductors 18, 20 and 22 from generator 12 is turned into an error signal by regulator 50 proportional to the amount of this deviation from the preset value. The error signal produced by regulator 50 is applied to terminals 144 and 146 of preamplifier and bias circuit 60 through lines 132 and 134. The preamplifier and bias circuit 60 may obtain its power from the generator output through a separate transformer, or as shown, it may obtain its output from the secondary of the vector summing circuit 40. In this instance, terminals 140 and 142 of preamplifier and bias circuit 60 are connected through lines 136 and 138 to lines 148 and 150 from vector summing circuit 40. The amplified error signal and bias voltages from terminals 148, 150, 152 and 154 from preamplifier and bias circuit 60 are applied to terminals 156, 158, 160 and 162 of reset and firing circuit 80. A signal proportional to the error signal from the voltage regulator 50 is applied to rectifier circuit 120 from terminals 164, 166, 168 and 169 through lines 170, 172, 174 and 175. In order to obtain electrical signals synchronized with the output of each phase of vector summing circuit 40, terminals 109, 111, 113 and 115 of reset and firing circuit 80 are connected to synchronizing pulse transformers 183, 185 and 187, and said pulse transformers are disposed in inductive relationship with lines 152, 150 and 148, respectively, from the secondary of vector summing circuit 40. More specifically, pulse transformer 183 has one side connected to terminal 109, pulse transformer 185 has one side connected to terminal 111, and pulse transformer 187 has one side connected to terminal 113. The remaining sides of pulse transformers 183, 185 and 187 are connected to terminal 115, and terminal 115 is also connected to the common point of the secondary windings 102, 104 and 106 of vector summing transformers 62, 64 and 66. Synchronizing pulse transformers 183, 185 and 187 saturate very early in the cycle and put out a spike each time their ampere turns pass through zero.

The rectifiers 36 and 120 form the static excitation circuit for supplying the correct field excitation current $I_f$ to field winding 16 of generator 12. The rectifier 36 is a three phase full wave dry type rectifier which may be comprised of semiconductor diodes 172 in each leg of the rectifier. The rectifier 120 is also a three phase, full wave, dry type rectifier which may be comprised of semiconductor diodes 181. However, rectifier 120 has switching devices in one leg of each phase, which may be semiconductor controlled rectifiers 176, 177 and 178. Each semiconductor controlled rectifier 176, 177 and 178 has a gate or control electrode G, and anode A and a cathode C. The output of rectifier 120 is connected through lines 180 and 182 to resistor 184. The lines 170, 172 and 174 from the reset and firing circuit 80 to rectifier 120, previously referred to, are connected to the gate or control electrodes G of controlled rectifiers 176, 177 and 178 respectively. Line 175 is connected to rectifier 120 at line 180.

In the operation of the static excitation system shown in FIG. 1, the reactors 74, 76 and 78 and shunt connected primary windings 68, 70 and 72 of vector summing transformers 62, 64 and 66 respectively, produce a current proportional to the voltage output of the generator 12, but substantially 90° out of phase in the lagging direction with the generator line-to-neutral voltage because of the inductive action of said reactors. Another component of current proportional to the generator output current is produced in series connected primary windings 46, 48 and 52 of vector summing transformers 62, 64 and 66. The current proportional to generator voltage and the current proportional to generator output current from generator armature 14 combine vectorially in said vector summing transformers and produce an output current in the vector summing transformer secondaries proportional to the vector sum of the two currents in the primary windings. Secondary 102 of vector summing transformer 62 produces a current $I_X$ proportional to the vector sum of currents $I_1$ and $I_2$. Similarly, secondary winding 104 of vector summing transformer 64 produces a current $I_Y$ and secondary winding 106 of vector summing transformer 66 produces a current $I_Z$. The currents $I_X$, $I_Y$ and $I_Z$ are applied to the three phase, full wave rectifier 36 and they are rectified by the rectified diodes 131, and a direct current voltage is applied to lines 30 and 32 which supply the field winding 16 with excitation current. The direct current $I_F$ produced by rectifying the vector summing currents $I_X$, $I_Y$ and $I_Z$ is slightly in excess of the field current required by the field winding 16 under any condition of load and circuit power factor. Voltage regulation is then accomplished by shunting of the excess excitation current away from the field windings. In this instance, the shunting of the excess current is accomplished by means of controlled rectifiers 176, 177 and 178 in the rectifier 120. Since the output of vector summing circuit 40 is connected to rectifier 120, as well as rectifier 36, when the controlled rectifiers conduct, he resistor 184 is connected across the secondary of the vector summing transformer 62, 64 and 66, similar to the field winding 16 which is also connected across the secondaries of vector summing transformers 62, 64 and 66. When the controlled rectifiers conduct and connect the resistor 184 in parallel with the field winding 16, a portion of the current from vector summing circuit 40 is shunted through the resistor 184. The amount of current shunted through resistor 184 and away from the field winding 16 is controlled by varying the firing angle of the controlled rectifiers proportional to the amplified error signal derived from the voltage regulator and current limiting circuits 50 and 55, the preamplifier 60 and firing circuit 80. The control rectifiers do not conduct until a signal is introduced into the gate electrode G. Once conduction has been initiated, the gate electrode G loses control and the controlled rectifier continues to conduct until the current through the anode-cathode circuit falls below a small value commonly called the holding current. Therefore, each time the alternating current drops to zero, the gate regains control and conduction is stopped until another signal is applied to the gate electrode G. By varying the point during the positive half cycle that the controlled rectifiers conduct, the time that the current is being shunted through resistor 184 can be varied. Therefore, an average field current $I_f$ can be established to provide the proper excitation current for the generator 12 under all conditions of load and power factor.

It should be noted that this arrangement provides a fail safe excitation system, in that a failure of the regulator and/or amplifier will result in only a slight change in the generator output voltage, as the current shunted by the regulator-amplifier combination is a very small portion of the total excitation current $I_f$. Further, the invention does not require the use of any non-linear components. Therefore, accurate calculations can be made predicting the performance of the system. Also no frequency sensitive components are required, eliminating the reqirement of any complicated frequency compensation networks. Other advantages of supplying the major excitation current in self-excited alternating current generators without going through control devices result from the fact that the control components that are used are low power devices and may be standardized or identical for all applications over a large range of alternating current generator sizes.

In order to insure positive build-up of the alternating current generator voltage at terminals 24, 26 and 28, a separate source of power may be provided for momentary field flashing. This source of power may be a battery 13 or a source of alternating current rectified by separate rectifiers and applied to the generator field winding 16. The momentary application of direct current power to the field circuit may be accomplished during start up by means of contacts 15 on a spring return start up switch, or as described in application Serial No. 260,770 filed February 25, 1963 by H. A. Steinbruegge, et al., and assigned to the same assignee as the present application.

A voltage regulator 50 that may be used is shown in FIG. 2. In general, voltage regulator 50 is comprised of a reactive current compensating circuit 200, a three phase full wave rectifier 202 and error detecting bridge 204.

The compensator circuit 200 comprises transformers 204, 206 and 208, reactor 210 and resistor 212. The action of this circuit is such that with normal voltage output of the generator, the alternating current voltage applied to the rectifier 202 in the regulator 50 is increased above the normal value in direct proportion to the reactive current being supplied by the generator. An increase in reactive current, therefore, causes the voltage regulator 50 to put out a signal to lower the generator output voltage. Thus, the generator output voltage is caused to drop in proportion to the reactive current being delivered to the generator. This action of the compensator circuit 200 enables alternating current generators operated in parallel to share the reactive load in proportion to their ratings.

The reactive current compensationg circuit 200 has its input terminals 91 and 69 connected to current transformer 73 and current limiting circuit 55, as shown in FIG. 2. Input terminals 69 and 91 are connected to tapped transformer 204. The output of transformer 204 is mixed with the voltage signal in current transformers 206 and 208 and applied to rectifier 202. The inductor 210 and variable resistor 212 provide a balance adjustment for the output of transformer 204. Input terminals 83, 85 and 87 of voltage regulator circuit 50 are connected, as shown in FIG. 2, to potential transformer 214 and the potential transformer 214 is in turn connected to current transformers 206 and 208, and rectifier 202. The input signal to input terminals 83, 85 and 87 of voltage regulator 50 is thus responsive to and varies with the output voltage of the generator 12. The voltage signal obtained, as hereinbefore stated, is modified by the reactive current compensating circuit from compensating circuit 200 in current transformers 206 and 208. The modified signal is applied to the three phase, full wave rectifier 202 which may be comprised of semiconductor diodes 216, and the rectified signal is applied to error detecting bridge circuit 204. The settings of the variable resistor 218 and adjustable rheostat 220 determine the output voltage to be maintained by the regulator.

The error detecting bridge 204 may be a conventional error detecting circuit comprising Zener diodes 222 and 224 in two legs of the bridge and resistors 230 and 232 in the remaining bridge legs. Any deviation between the magnitude of the reverse breakdown voltage of the Zener diodes 222 and 224 and the generator output voltage signal appears at terminals 234 and 238 of error detecting bridge 204 as a polarized direct current signal. More specifically, when a direct current voltage is applied to the input terminals 240 and 242 which is equal to twice the voltage drop across each Zener diode 222 and 224, there will be substantially no voltage difference at the output terminals 234 and 238. When the input voltage is above or below the reference voltage of the bridge, then a voltage difference will exist across the output terminals 234 and 238. The polarity of this signal depends upon whether the input signal is above, or below, the desired voltage as determined by the setting on generator voltage adjustment 220. The error signal from voltage regulator 50 is applied to output terminals 61 and 93; output terminal 61 is connected to terminal 59 on current limiting circuit 55 and output terminal 93 is connected to terminal 146 on preamplifier and bias circuit 60.

A current limiting circuit that may be used is shown in FIG. 3. When the generator output is shorted, the voltage falls to zero and hence the voltage regulator no longer puts out the proper signal. The function of the current limiting circuit 55 is to provide a signal to the preamplifier and bias circuit during the short circuit condition to limit the short circuit current. This is accomplished in this instance by obtaining a voltage proportional to the generator output current through current transformers 71, 73 and 75 shown in FIG. 1, rectifying the signal in dry type rectifier 260 shown in FIG. 2 and applying it to a Zener diode 262. If the generator output current is within predetermined limits, the voltage developed will not be sufficient to exceed the reverse breakdown voltage of the Zener diode 262, and hence the current limiting circuit 55 will not provide a signal during this period. If the generator current exceeds a predetermined value, a voltage sufficient to cause the Zener diode to conduct is produced, and a signal is applied to the preamplifier and bias circuit 60. This signal, when amplified and applied to the firing circuit 80 and controlled rectifiers 176, 177 and 178 will limit the generator output current. The current transformers 264, 266 and 268, which have one side of their primary windings 270, 272 and 274 connected to terminals 63, 65 and 67 and the other side of the primaries connected together at a common point 281, are auxiliary transformers for obtaining a suitable range of voltage for proper operation of the circuit components.

The secondary windings 276, 278 and 280 of current transformers 264, 266 and 268 each have one side connected to a leg of rectifier 260 at junctions 284, 286 and 288 and the remaining sides are connected together at a common point 282.

The rectifier 260 is a three phase, full wave rectifier and may be comprised of semiconductor diodes 290. Adjustable resistor 292 connected across the output terminals 302 and 304 of rectifier 260 allows selection of the generator current magnitude that will cause current limiting circuit 55 to produce a signal.

Rectifier 294, which may be a semiconductor diode is connected between Zener diode 262 and terminal 57 to block the signal from the voltage regulator 50. Resistor 296 is connected between terminals 57 and 59 and carries the signal from the voltage regulator 50 from terminal 59 to 57 so it can continue to the preamplifier and bias circuit 60.

Figure 4:
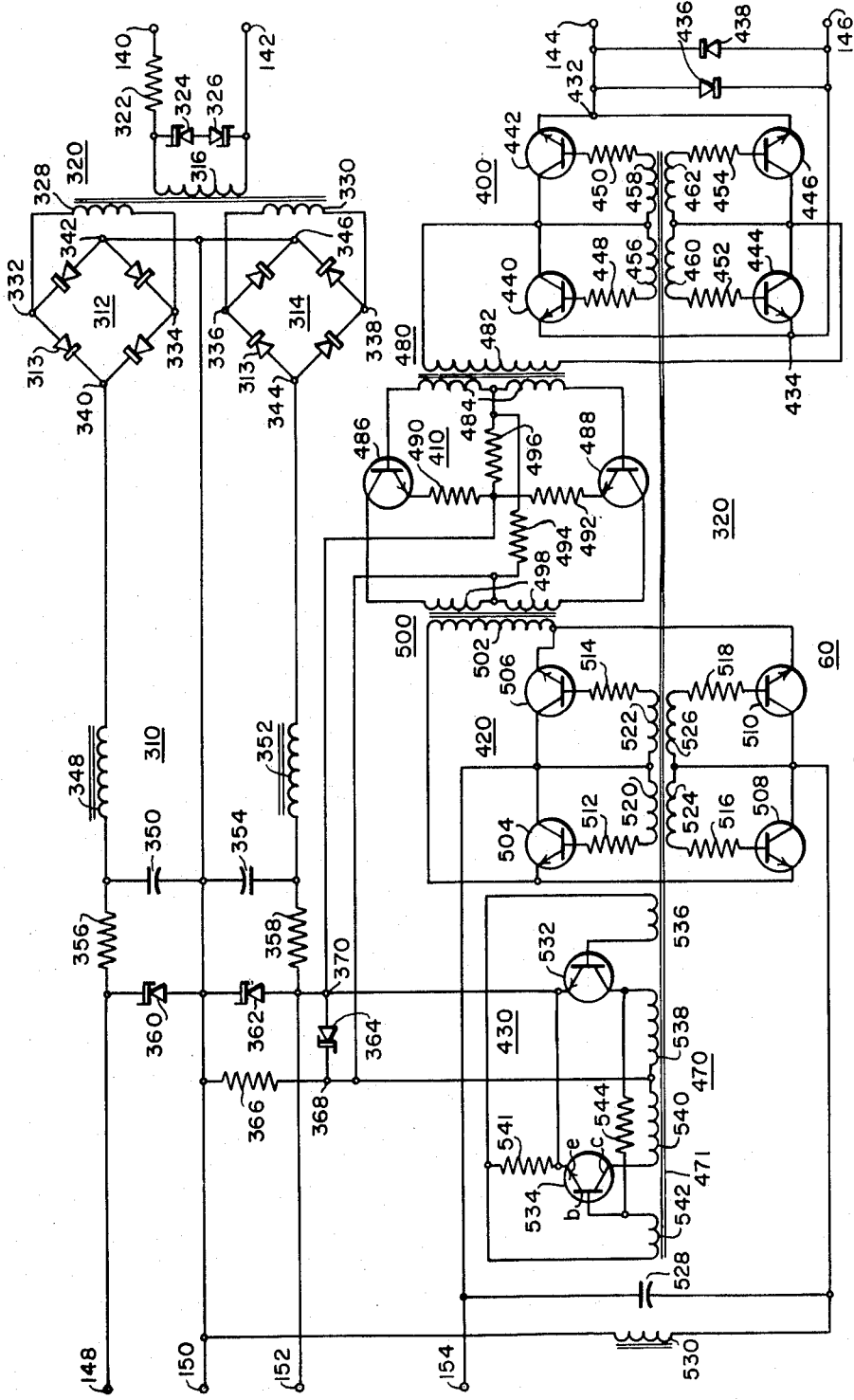
FIG. 4 is a schematic diagram of a preamplifier and bias circuit that may be used with the circuit shown in FIG. 1.

A preamplifier and bias circuit 60 that may be used is shown in FIG. 4. The bias circuit 310 has its input terminals 140 and 142 connected to the secondary windings of vector summing circuit 40, as shown in FIG. 1.

Input terminals 140 and 142 are connected to the primary winding 316 of transformer 320 through resistor 322. Rectifiers 324 and 326, which may be Zener diodes, limit the incoming voltage to a predetermined value. The secondary windings 328 and 330 of transformer 320 are connected to single phase, full wave dry type rectifiers 312 and 314. Secondary winding 328 is connected to the input terminals 332 and 334 of rectifier 312 and secondary winding 330 is connected to input terminals 336 and 338 of rectifier 314. Rectifiers 312 and 314 may be comprised of semiconductor diodes 313. The ripple in the direct current voltage output of rectifiers 312 and 314 may be filtered by inductor 348, capacitor 350, and inductor 352 and capacitor 354, respectively. Resistors 356 and 358 are ballast resistors for the Zener diodes 360 and 362. Zener diodes 360 and 362 provide a regulated direct-current voltage at output terminals 148, 150 and 152 by conducting current in their reverse direction when the desired voltage is exceeded. Bias voltage for the preamplifier circuit 320 is obtained from bias circuit 310 and further regulated by Zener diode 364 connected across the bias supply voltage to the preamplifier circuit 320 at junctions 368 and 370. Resistor 366 is a ballast resistor for the Zener diode 364.

The preamplifier circuit 320 is a low-level direct current amplifier whose purpose is to amplify the voltage level of the error signal from the voltage regulator 50 to a magnitude required by the firing circuit 80. The additional gain provided by the preamplifier circuit 320 is required to give the regulating system the desired accuracy.

The preamplifier in general consists of a chopper circuit 400, an alternating current amplifier 410, a synchronous switch 420 and an oscillator circuit 430.

The input terminals 144 and 146 of the preamplifier circuit 320 are connected to the chopper circuit 400 at junctions 432 and 434. The semiconductor rectifiers 436 and 438 across the input terminals 144 and 146 limit the signal input to a voltage below the forward breakdown voltage of the rectifiers and thus, protects the transistors used in the chopper circuit. The chopper circuit includes transistors 440, 442, 444 and 446, resistors 448, 450, 452 and 454, and windings 456, 458, 460 and 462 of transformer 470.

As will be described in greater detail later, the voltage across windings 456, 458, 460 and 462 of transformer 470 is a square wave. The polarity of the windings is such that transistors 440 and 446, and 442 and 444 are saturated on alternate half cycles. When transistors 440 and 446 are saturated, current flows through these transistors. On the alternate half cycle, the current flows through transistors 442 and 444. The direct current voltage applied to the chopper circuit 400 thus is converted to a square wave or an alternating voltage and is applied to the primary 482 of transformer 480. The voltage appearing at the secondary 484 of transformer 480 is amplified in amplifier 410, which is a typical class B, push-pull amplifier. The amplifier 410 includes transistors 486 and 488 and resistors 490 and 492. Resistors 490 and 492, in series with the emitters of transistors 486 and 488, stabilize said transistors so that they will not go into thermal runaway at elevated junction temperatures. Bias voltage for transistors 486 and 488 is obtained across resistor 494 and resistor 496 from the bias circuit 310. The output of the amplifier 410 is applied to primary winding 498 of transformer 500. The secondary 502 of transformer 500 is connected to the synchronous switch circuit 420. The synchronous switch circuit 420 includes transistors 504, 506, 508 and 510, resistors 512, 514, 516 and 518 and windings 520, 522, 524 and 526 of transformer 470. The synchronous switch is electrically similar to the chopper circuit 400, but performs the opposite function. The chopper circuit 400 has the function of converting a direct current voltage into an alternating current voltage which can be transformed and applied to an alternating current amplifier. Conversely, the synchronous switch takes the alternating current voltage applied to it by the alternating current amplifier 410 and rectifies it to a direct current voltage. Since the windings of transformer 470 that drive the chopper circuit 400 and synchronous switch circuit 420 are common to the same core 471, they operate at the same frequency and phase relationship. The ripple in the direct current output from the synchronous switch circuit 420 is filtered by inductor 530 and capacitor 528 and applied to the output terminals 154 and 150.

The oscillator 430 includes transistors 532 and 534, each having an emitter electrode $e$, collector electrode $c$, and base electrode $b$, and windings 536, 538, 540 and 542 of transformer 470. The core 471 of transformer 470 is constructed of square loop material. To understand the operation of oscillator 430, consider resistor 544 an open circuit, consider transistor 534 just switched on or saturated and transistor 532 just cut-off or made non-conducting. The supply voltage appears across winding 540 of transformer 470. A proportional voltage is induced into the other windings of transformer 470. The voltage across winding 542 keeps transistor 534 saturated and the voltage across winding 536 keeps transistor 532 cut-off or non-conducting. As the current continues to increase, the arrangement of the windings 536, 538, 540 and 542 causes transistor 534 to come out of saturation. When transistor 534 comes out of saturation, the flux in the core 471 of transformer 470 reverses, reversing the polarity on winding 536. The flux reversal starts transistor 532 into saturation and transistor 534 is made non-conducting. This process continues, producing square wave voltages in all windings, as long as direct current voltage is applied to the oscillator circuit 430.

Should transistors 532 and 534 become non-conducting at the same time, the circuit will not go into oscillation because only leakage currents will flow through the transistors 532 and 534 and there will be no flux reversal in the core 471 of transformer 470. This condition could arise when voltage is initially applied to the circuit. To insure that the circuit will go into oscillation, the resistor 544 is connected between the collector electrode $c$ of transistor 532 and the base electrode $b$ of transistor 534. When voltage is first applied, current flows from emitter electrode $e$ to base electrode $b$ of transistor 534 through resistor 544 and winding 538. This current flow saturates transistor 534 and starts oscillation.

Figure 5:
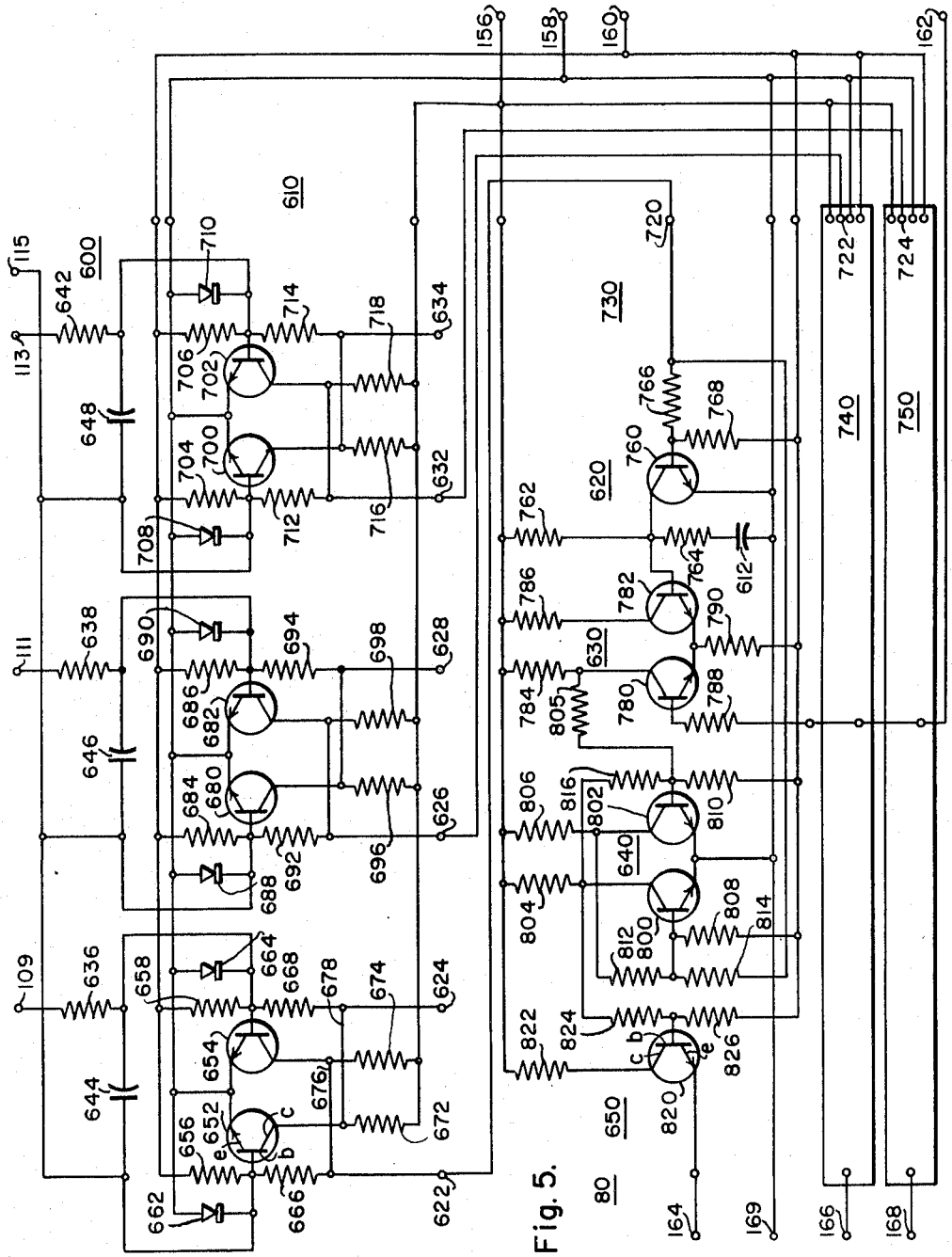
FIG. 5 is a schematic diagram embodying the teachings of this invention.

A reset and firing circuit embodying the principles of this invention is illustrated in FIG. 5. As hereinbefore described and shown in FIG. 1, controlled rectifiers 176, 177 and 178 are used as static switches to shunt current away from the field winding 16 of the generator 12 in response to an error signal. The controlled rectifiers 176, 177 and 178 are switched on once during each positive cycle and shunt a portion of the current from vector summing circuit 40 through resistor 184 until the end of the positive half-cycle. The earlier in the cycle the controlled rectifiers are switched, the greater the reduction in field current $I_f$. The purpose of the firing circuits is to supply to the gate electrodes $g$ of the controlled rectifiers 176, 177 and 178 variable width pulses whose width is determined by the error signal produced by the voltage regulator 50 and current limiting circuit 55. These pulses always start after the beginning of the positive half-cycle and end at the termination of the positive half-cycle. The delay angle at which the pulses start after the beginning of the positive half-cycle is determined by the error signal. Firing circuit 80 produces variable width voltage pulses instead of voltage spikes to fire the controlled rectifiers 176, 177 and 178 to positively ensure firing of the controlled rectifiers and consequently produce stable operation. With an inductive load, as hereinbefore described, instabilities could occur if voltage spikes were used as the firing means, as the spikes may occur while the inductance is discharging and hence the controlled rectifiers may fail to conduct.

To accurately control the firing of the controlled rectifiers 176, 177 and 178, the variable width pulse introduced by the reset and firing circuit 80 must be synchronized with the output of the vector summing transformers and the delay angle must be controlled as a function of the error signal. A method of accomplishing the synchronizing would comprise connecting a saturating transformer into the secondaries of each of the vector summing transformers 62, 64 and 66, as shown in FIG. 1. The saturating transformers saturate early in the voltage cycle and put out a voltage spike each time their ampere turns pass through zero. These spikes are used for synchronizing purposes.

Figure 6:
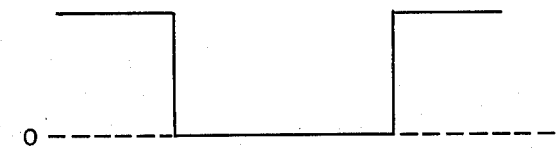
FIG. 6 is a waveform illustrating the reset voltage for synchronizing the firing pulses.

The reset and firing circuits shown in FIG. 5 utilizes RC or resistance-capacitance networks 600 to filter the pulses from the secondaries of synchronizing pulse transformers 183, 185 and 187, shown in FIG. 1. These pulses are used to control solid state flip-flop circuits 610 which put out square waves for synchronizing and reset purposes. Square waves typical of those produced by this synchronizing circuit are shown in FIG. 6.

Figure 7:
FIG. 7 is a waveform typical of those produced by the ramp voltage generator which is a portion of the circuit illustrated in FIG. 5.
Figure 8:
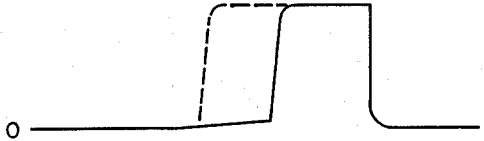
FIG. 8 is a waveform of the voltage output from a differential amplifier that compares an error voltage with the ramp voltage shown in FIG. 7.
Figure 9:
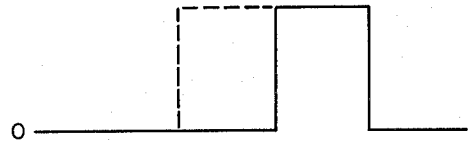
FIG. 9 is a waveform typical of the firing pulses produced by the circuit shown in FIG. 5.

During one-half cycle of the reset square wave from synchronous square wave generator circuit 610, a capcitor 612 in ramp generator circuit 620 is allowed to charge at substantially a linear rate. The linear voltage increase, having in general a saw tooth shape, is referred to as the ramp voltage, with a typical waveform being shown in FIG. 7. This ramp voltage is compared with the error voltage applied to terminal 162 in differential amplifier circuit 630. As soon as the increasing ramp voltage from ramp generator circuit 620 exceeds the error voltage, the differential amplifier voltage increases and is quickly driven to ceiling. The output from the differential amplifier is shown in FIG. 8. The dotted line illustrates a wider pulse which is produced when the error signal is small and is exceeded by the ramp voltage earlier in the cycle. This rapid change in the differential amplifier output voltage is used to turn on flip-flop circuit 640, producing a steep front variable width pulse which is amplified in amplifier circuit 650 and applied to terminal 164 and hence to the gate electrode G of one of the controlled rectifiers. This signal is held constant until the end of the positive half-cycle. FIG. 9 illustrates a typical waveform of the output of the flip-flop circuit 640. The dotted line illustrates a wider pulse which is produced when the error signal is smaller. At this point, the reset voltage turns on and turns off the flip-flop circuit 640 and discharges the capacitor 612. The capacitor 612 is held at zero potential for a half-cycle until the reset voltage is terminated and the cycle is then repeated. Reducing the magnitude of the error signal allows the differential amplifier 630 to increase its output earlier in the cycle, i.e., the ramp voltage exceeds the error voltage earlier in the cycle thus reducing the delay angle and, therefore, shunting more current away from the field winding 16. Increasing the error signal causes the differential amplifier 630 to increase its output later in the cycle, thus increasing the delay angle and, therefore, shunting less current away from the field winding 16.

In this instance, we have three firing circuits because we have three controlled rectifiers 176, 177 and 178. However, if six controlled rectifiers were used, as would be required in the circuit configuration where the secondaries of the vector summing transformers are connected in a six phase star network and rectified in a six phase half wave rectifier, only three synchronizing circuits, as shown in FIG. 5, would be required. The voltages on the two synchronizing flip-flop outputs are 180° out of phase so that while one flip-flop output is resetting one condenser, the other output is allowing the diametrically opposite condenser to charge. Therefore, in this instance where only three controlled rectifiers are used, only output terminals 622, 626 and 632 are used of synchronizing circuit 610. Terminals 624, 628 and 634 are not used in this instance.

Figure 10:
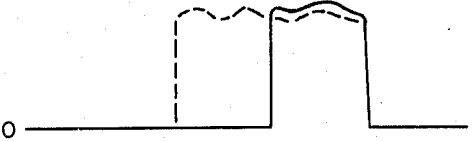
FIG. 10 is a waveform typical of the current shunted away from the field winding of the dynamoelectric machine.

If the controlled rectifiers are fired at zero delay, the maximum current is shunted away from field winding 16. As the delay angle approaches 180°, the shunted current approaches zero. The current through the shunting resistor 184 shown in FIG. 1 is substantially a linear function of the error voltage because of the linearity of the ramp voltage produced in ramp generator circuit 620. FIG. 10 illustrates the waveform of current through the shunt resistor 184. Therefore, there is substantially a linear relationship between the error voltage and the current shunted away from the field winding 16.

More specifically, terminals 109, 111, 113 and 115 are connected to synchronizing pulse transformers 183, 185 and 187, as shown in FIG. 1 and hereinbefore described. Terminals 109, 111, 113, and 115 are also connected to the RC filtering circuit 600. The first of the three filtering and flip-flop networks is responsive to the output of synchronizing pulse transformer 183 and includes resistor 636 and capacitor 644, transistors 652 and 654, rectifiers or semiconductor diodes 662 and 664 and biasing resistors 656, 658, 666, 668, 672 and 674. The resistor 636 and capacitor 644 filter the pulses which are in synchronism with the output of vector summing transformer 66. These pulses are applied to the base electrodes of transistors 652 and 654. Transistors 652 and 654, which in this instance are of the NPN junction type having a base electrode $b$, emitter electrode $e$ and collector electrode $c$, are connected in the common emitter configuration. First, looking only at transistor 652, application of a signal to the base electrode $b$ of transistor 652 will cause the transistor to saturate and act like a closed switch, grounding the output. If the input is grounded or unconnected, the transistor 652 loses its base drive and goes to the cut-off or nonconducting state, approaching an open switch. Some leakage current does flow at cut-off, however, and this is reduced by applying a small negative bias current from the negative terminal 160 through resistor 656. By utilizing transistor 654 in conjunction with transistor 652 and connecting one input of each to the output of the other by lines 676 and 678, a bistable device known at a flip-flop circuit is created. Assume that in the initial state the transistor 652 is cut-off or nonconducting and transistor 654 is saturated. Application of a voltage pulse from the synchronizing pulse transformer 183 through the filter network 600 comprising resistor 636 and capacitor 644 will saturate transistor 652 and cut-off or cause transistor 654 to become non-conducting. The transistor 652 and 654 will stay in that condition even upon removal of the pulse, since the output of transistor 654 keeps transistor 652 saturated until a signal is applied to transistor 654. Therefore, a square wave is generated by the flip-flop circuit, comprising transistors 652 and 654, which is in synchronism with the output of vector summing tranformer 66 and is supplied to terminals 622 and 624. As hereinbefore mentioned, only the output from terminal 622 is used in this instance because the secondary of vector summing circuit 40 is connected in a three phase output rather than a six phase star.

Similarly, the filtering and flip-flop circuit responsive to the output of vector summing transformer 64 includes resistor 638 and capacitor 646, which form the filter network, transistors 680 and 682, rectifiers or semiconductor diodes 688 and 690, and biasing resistors 684, 686, 692, 694, 696, and 698. This circuit produces a square wave pulse synchronized with the output of vector summing transformer 64 and it is applied to terminals 626 and 628. The third circuit, responsive to the output of vetor summing transformer 62, is similar to the first two hereinbefore described. Resistor 642 and capacitor 648 form the filter network, and the synchronous square wave generator or flip-flop circuit includes transistors 700 and 702, rectifier or semiconductor diodes 708 and 710, and biasing resistors 704, 706, 712, 714, 716 and 718. This circuit generates a square wave pulse synchronized with the output of vector summing transformer 62 and it is applied to terminals 632 and 634.

The synchronized square wave pulses produced by synchronizing circuit 610 are applied to firing circuits 730, 740 and 750, with the output from terminal 622 being applied to firing circuit 730 at input terminals 720; the output of terminal 626 being applied to firing circuit 740 at terminal 722 and the output of terminal 632 being applied to firing circuit 750 at terminal 724.

Firing circuit 730 in general comprises a ramp generator 620, a differential amplifier 630, a flip-flop circuit 640 and an amplifier 650. In the operation of firing circuit 730, the synchronized square wave pulses from terminal 622 of synchronizing circuit 610 are applied to the input terminal 720. Ramp generator 620 includes transistor 760, having a base electrode $b$, collector electrode $c$, and emitter electrode $e$, capacitor 612 and resistors 762, 764, 766 and 768. During one-half cycle of the reset square wave from circuit 610, the capacitor 612 is allowed to charge at substantially a linear rate. The collector resistance 762 of transistor 760 determines the time constant and rate of rise of the ramp voltage, while resistor 764 in series with capacitor 612 has relatively low resistance and limits the discharge current. Resistors 766 and 768 are biasing resistors. The ramp voltage produced by ramp generator circuit 620 is compared with the error voltage from the voltage regulator and current limiting circuits 50 and 55 using a differential amplifier 630. Differential amplifier 630 includes transistors 780 and 782, which may be NPN junction transistors each having a base electrode $b$, an emitter electrode $e$ and a collector electrode $c$, and resistors 784, 786, 788 and 790. The resistor 790 in the emitter circuit acts as a constant current source, with the current flowing through the transistor whose base is more positive. The other transistor will be cut-off or made nonconducting. The ramp voltage is applied to base electrode $b$ of transistor 782 and the error voltage is applied to base electrode $b$ of transistor 780. As the polarity of one base with respect to the other becomes more positive, there is a gradual transfer of current from one side to the other and it is during this portion of time that the circuit acts as a true differential amplifier. In this application, it is desirable for this transfer time to be as short as possible and therefore have the circuit function as a polarity detector with switching characteristics.

When the ramp voltage from ramp generator 760 applied to base electrode $b$ of transistor 782 exceeds the error voltage, the differential amplifier output voltage increases and is quickly driven to its maximum value. This rapid change in the differential amplifier output voltage is used to turn on flip-flop circuit 640 which produces a steep wave front pulse with a width dependent upon the difference between the error voltage and ramp voltage. When the error voltage is small, the ramp voltage exceeds the error voltage earlier in the cycle than when the error voltage is large. Therefore, the differential amplifier circuit 630 produces an output earlier and flip-flop circuit 640 produces a pulse earlier, generating a wider pulse when the error signal is small, than it does when the error signal is larger. Flip-flop circuit 640 includes transistors 800 and 802, which may be NPN junction transistors having a base electrode $b$, emitter electrode $e$, and collector electrode $c$, and biasing resistors 804, 805, 806, 808, 812, 814 and 816.

The pulse generated by the flip-flop circuit 640 continues until the end of the positive half cycle. At this time, the reset voltage turns on and terminates the output from the flip-flop circuit 640. The reset voltage is applied to the base of transistor 800 through resistor 814 from terminal 720. The reset voltage, at the same time causes transistor 760 to conduct, discharging capacitor 612. Thus, capacitor 612 is ready to build up during the next positive cycle.

The square wave output pulse from flip-flop circuit 640 is applied to amplifier circuit 650 and the amplified signal is applied to terminal 164 and hence to the gate electrode g of controlled rectifier 176. Amplifier 650 includes transistor 820, which may be an NPN junction type transistor having a base electrode b collector electrode c and emitter electrode e, and resistors 822, 824 and 826. Amplifier 650 is a conventional emitter follower type amplifier, taking the incoming signal from resistor 804 and producing an output at its emitter electrode e. Resistors 822, 824 and 826 are biasing resistors. Firing circuits 740 and 750 are similar in operation to firing circuit 730 just described and provide firing pulses at terminals 166 and 168 for controlled rectifiers 177 and 178.

In operation of the firing and reset circuit, pulses are produced in synchronizing pulse transformers 183, 185, and 187 in synchronism with the output of vector summing circuit 40, as shown in FIG. 1. The pulses are filtered in filtering network 600 and form synchronized square waves in flip-flop circuits 610. These synchronized square waves control the timing of the ramp voltage generator circuit 620 and flip-flop circuit 640. On one, one-half cycle of the synchronized square wave input, capacitor 612 charges at substantially a linear rate, and on the next one-half cycle, capacitor 612 discharges and is then ready for the next half cycle. The ramp voltage produced in circuit 620 is applied to differential amplifier circuit 630 and it is compared with the error voltage produced by voltage regulator and current limiting circuits 50 and 55. As soon as the ramp voltage exceeds the error voltage, the differential amplifier circuit 630 produces an output which triggers or initiates flip-flop circuit 640 into producing an output which is amplified in circuit 650 and applied to the gate electrode g of controlled rectifier 176. The pulse generated by the flip-flop circuit 640 has a width that varies with the error voltage. It starts during the positive one-half cycle when the ramp voltage exceeds the error voltage, therefore, the greater the error voltage, the narrower the width of the pulse, and the smaller the error voltage, the greater the width of the pulse. The pulse ends at the termination of the positive half cycle, by virtue of the reset voltage being applied to the flip-flop circuit 640.

Therefore, when the error signal is large, the delay angle is increased because the ramp voltage exceeds the error voltage later in the half cycle. The square wave pulse applied to the gate electrode of the controlled rectifier is, therefore, narrow and the portion of the current shunted through the shunting resistor 184 is relatively small, allowing a large excitation current to flow through field winding 16 of the generator 12. Conversely, if the error signal is small, the delay angle is increased. The square wave applied to the gate electrode of the controlled rectifier is, therefore, wider and the portion of current shunted around the field 16 is larger, reducing the excitation current flowing through the field winding 16.

In summary, the function of firing circuit 80 is to supply pulses to the gate electrodes G of controlled rectifiers 176, 177 and 178. The controlled rectifiers constitute the power amplifier element in the voltage regulating system and serve to control the amount of excitation energy delivered to the field winding 16 of the generator 12. The pulses delivered to the terminals 164, 166 and 168 of firing circuit 300 are synchronized with the alternating current supply current supplied to the controlled rectifiers 176, 177 and 178 by vector summing circuit 40. The pulses cause the controlled rectifiers to fire or switch on once during each positive half cycle of the supply current at a certain delay angle. The delay angle is proportional to the amplified error signal obtained from the voltage regulator or current limiting circuits 50 and 55, respectively. Once the controlled rectifiers 176, 177 and 178 are turned on, they remain conductive until the end of the positive half cycle of the supply current. When the current through the controlled rectifiers 176, 177 and 178 drops to zero or a value below their holding current, the gate electrodes G regain control and block further control of current until another signal is applied to said gate electrodes. The earlier in the cycle at which the controlled rectifiers are turned on, the greater the amount of energy shunted from the field circuit. Thus, the voltage regulator 50 controls generator excitation by varying the output of the controlled rectifiers by control of the firing circuit 80.

It will, therefore, be apparent that there has been disclosed a highly stable and reliable static control circuit for excitation systems. The firing pulses produced by the static control circuit are square waves having widths corresponding to the period of time the static switches are to be made conductive. Furthermore, the width of the firing pulse is proportional to an error signal and the pulse is synchronized with the current supply the static switches are to control.

Since numerous changes may be made in the above described apparatus and different embodiments of the invention may be made without departing from the spirit thereof, it is intended that all matter contained in the foregoing description or shown in the accompanying drawings shall be interpreted as illustrative and not in a limiting sense.

We claim as our invention:

1. An electrical control circuit for controlling static switches in response to an input signal and in phase with an electrical quantity comprising first means producing a first signal in phase with said electrical quantity, second means producing a second signal responsive to said first signal, said second signal being substantially a square wave, third means producing a third signal in phase with said second signal, said third signal having a linearly variable magnitude, fourth means comparing said third signal and input signal and producing a fourth signal starting when the magnitude of said third signal exceeds the magnitude of said input signal, and fifth means producing a fifth signal having a substantially square waveform synchronized with said electrical quantity and having a width responsive to said second and fourth signals, said fourth signal determining the starting point of said fifth signal and said second signal determining its terminating point, said fifth signal being applied to said static switches.

2. An electrical control circuit for controlling the conduction of solid state switching devices in response to a first signal and in phase with an electrical quantity comprising, first means producing a second signal in phase with said electrical quantity, second means connected in circuit relation with said first means producing a third signal responsive to said second signal, said third signal being substantially a square wave, third means connected in circuit relation with said second means producing a fourth signal responsive to said third signal, said fourth signal having a linearly variable magnitude, fourth means connected in circuit relation with said third means and said first signal comparing said first and fourth signals and producing a fifth signal when the magnitude of said fourth signal exceeds the magnitude of said first signal, fifth means connected in circuit relation with said fourth and second means producing a sixth signal in phase with said electrical quantity and having a substantially square waveform, the start of said sixth signal being responsive to said fifth signal, the termination of said sixth signal being responsive to said third signal, and sixth means connected in circuit relation with said fifth means amplifying said sixth signal and applying the amplified signal to said solid state switching devices.

3. In an electrical control circuit having a source voltage and first signal applied to it for controlling the switching of said source voltage with controlled rectifier means the combination comprising, first means connected in circuit relationship with said source voltage producing a second signal in phase with said source voltage, said first means comprising transformer means, second means comprising transistors connected in a bistable flip-flop arrangement and producing a third signal in response to said second signal, said third signal being substantially a square wave, third means comprising a transistor and capacitance means producing a fourth signal in phase with said third signal and having a linearly variable magnitude, fourth means comprising transistors connected in a differential amplifier arrangement and producing a fifth signal having a starting point responsive to the difference between said first and and fourth signals, fifth means producing a sixth signal, said fifth means comprising transistors connected in a bistable flip-flop arrangement, said sixth signal being substantially a square wave having a width responsive to said third and fifth signals, sixth means comprising a transistor for amplifying said sixth signal and applying said sixth signal to said controlled rectifier means.

4. In an electrical control circuit having a source voltage and first signal applied to it for controlling the switching of said source voltage by producing control signals responsive to said first signal and applying said signal to solid state switching means, the combination comprising, first means comprising synchronizing pulse transformer means connected in circuit relationship with said source voltage producing a second signal in phase with said source voltage, second means connected in circuit relationship with said first means and comprising first and second transistors connected so that when one transistor is conducting the other is nonconducting, and producing a third signal responsive to said second signal, said third signal having substantially a square waveform, third means connected in circuit relationship with said second means and comprising a transistor and capacitance means producing a fourth signal having a slope varying in a linear manner and responsive to said third signal, said capacitance charging at a linear rate during one-half cycle of said third signal and discharging during the next one-half cycle of said third signal, fourth means connected in circuit relationship with said first and fourth signals and comprising first and second transistors connected in a differential amplifier arrangement, said fourth means producing a fifth signal having a width responsive to the difference between said first and fourth signals, fifth means connected in circuit relation with said second and fourth means and comprising first and second transistors connected so that when one transistor is conducting the other is nonconducting and producing a sixth signal having substantially a square waveform and a width determined by said third and fifth signals, and amplifying means connected in circuit relationship with said fifth means for amplifying and applying said amplified sixth signal to said solid state switching means.

5. In an excitation system for dynamoelectric machines having field current and error signal producing means, a static control circuit for producing control signals to be applied to solid state switching devices the combination comprising first means connected in circuit relation with said field current producing means providing a first signal in phase with said field current, second means connected in circuit relation with said first means providing a second signal responsive to said first signal, said second signal being substantially a square wave, third means connected in circuit relation with said second means providing a third signal in phase with said second signal, said third signal having a linearly increasing magnitude, fourth means connected in circuit relation with said third means and said error signal producing means comparing said third signal and said error signal and providing a fourth signal starting when the magnitude of said third signal exceeds the magnitude of said error signal, and fifth means connected in circuit relation with said second and fourth means providing a fifth signal in phase with said field current and responsive to said second and fourth signals, the starting point of said fifth signal being determined by said fourth signal and the terminating point being determined by said second signal, said fifth signal being applied to said static switching devices.

6. In an excitation system for dynamoelectric machines having field current and error signal producing means, a static control circuit for controlling said field current by producing control signals to be applied to solid state switching devices, the combination comprising first means connected in circuit relation with said field current producing means providing a first signal in phase with said field current, second means connected in circuit relation with said first means providing a second signal responsive to said first signal, said second signal being substantially a square wave, third means connected in circuit relation with said second means providing a third signal responsive to said second signal, said third signal having a linearly variable magnitude, fourth means connected in circuit relation with said error producing means and said third means comparing said error and third signals and producing a fourth signal starting when the magnitude of said third signal exceeds the magnitude of said error signal, fifth means connected in circuit relation with said fourth and second means producing a fifth signal in phase with said field current and having a substantially square waveform, the start of said fifth signal being responsive to said fourth signal and the termination of said fifth signal being responsive to said second signal, and sixth means connected in circuit relation with said fifth means amplifying said fifth signal and applying the amplified signal to said solid state switching devices.

7. In an excitation system for dynamoelectric machines having field current and error signal producing means a static control circuit for controling said field current by producing control signals to be applied to controlled rectifier means the combination comprising first means disposed in inductive relation with said field current producing means producing a first signal in phase with said field current, said first means comprising saturating transformers, second means comprising transistors connected in a bistable flip-flop arrangement and producing a second signal in response to said first signal, said second signal being substantially a square wave, third means comprising a transistor and capacitance means producing a third signal in phase with said second signal and having a linearly variable magnitude, fourth means comprising transistors connected in a differential amplifier arrangement and producing a fourth signal having a starting point responsive to the difference between said error and third signals, fifth means producing a fifth signal, said fifth means comprising transistors connected in a bistable flip-flop arrangement, said fifth signal being substantially a square wave in phase with said field current and having a width responsive to said second and fourth signals, sixth means comprising a transistor amplifier for amplifying said fifth signal and applying said fifth signal to said controlled rectifier means.

8. In an excitation system for dynamoelectric machines having field current and error signal producing means a static control circuit for controlling said field current by producing control signals to be applied to transistor switching means, the combination comprising first means comprising transformer and filtering shaping means connected in circuit relationship with said field current producing means providing a first signal in phase with said field current, second means connected in circuit relationship with said first means and comprising first and second transistors connected so that when one transistor is conducting the other is nonconducting, and producing a second signal responsive to said first signal, said second signal having substantially a square waveform, third means connected in circuit relationship with said second means and comprising a transistor and capacitance means producing a third signal having a slope increasing in a linear manner and responsive to said second signal, said capacitance charging at a linear rate during one-half cycle of said second signal and discharging during the next one-half cycle of said second signal, fourth means connected in circuit relationship with said error signal producing means and said third means and comprising first and second transistors connected in a differential amplifier arrangement, said fourth means producing a fourth signal having a width responsive to the difference between said error and third signals, fifth means connected in circuit relationship with said second and fourth means and comprising first and second transistors connected so that when one transistor is conducting the other is nonconducting and producing a fifth signal having substantially a square waveform in phase with said field current and having a width determined by said second and fourth signals, and amplifying means connected in circuit relationship with said fifth means for amplifying and applying said amplified fifth signal to said transistor switching means.

References Cited by the Examiner
UNITED STATES PATENTS 2,896,149    7/1959    Lowry et al. _____ 322—28

LLOYD McCOLLUM, *Primary Examiner.*

A. H. TISCHER, *Assistant Examiner.*